US009083737B2

(12) United States Patent
Hermanns et al.

(10) Patent No.: US 9,083,737 B2
(45) Date of Patent: *Jul. 14, 2015

(54) MITIGATING THREATS IN A NETWORK

(71) Applicant: Cisco Technology, Inc., San Jose, CA (US)

(72) Inventors: Klaus Hermanns, Cary, NC (US); James L. Fenton, Los Altos, CA (US); Venkateswara Rao Yartagadda, Bangalore (IN); Chandra S. Buduguru, Bangalore (IN); Chandrahasa C. Pullagura, Bangalore (IN); Rajiv Raghunarayan, Mumbai (IN); Barry L. Greene, Cupertino, CA (US); Ellis R. Dobbins, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/938,917

(22) Filed: Jul. 10, 2013

(65) Prior Publication Data

US 2013/0305362 A1 Nov. 14, 2013

Related U.S. Application Data

(63) Continuation of application No. 11/677,872, filed on Feb. 22, 2007, now Pat. No. 8,488,488.

(51) Int. Cl.
*H04L 29/06* (2006.01)

(52) U.S. Cl.
CPC ...... *H04L 63/1441* (2013.01); *H04L 29/06877* (2013.01); *H04L 29/06884* (2013.01); *H04L 29/06891* (2013.01); *H04L 29/06897* (2013.01); *H04L 29/06904* (2013.01); *H04L 29/06911* (2013.01); *H04L 63/08* (2013.01); *H04L 63/101* (2013.01)

(58) Field of Classification Search
None
See application file for complete search history.

(56) References Cited

U.S. PATENT DOCUMENTS

| 6,321,338 | B1 | 11/2001 | Porras et al. |
|---|---|---|---|
| 7,035,202 | B2 | 4/2006 | Callon |
| 7,039,720 | B2 | 5/2006 | Alfieri et al. |
| 7,302,704 | B1 | 11/2007 | Elliott |
| 7,472,422 | B1 | 12/2008 | Agbabian |
| 2004/0260945 | A1 | 12/2004 | Raikar et al. |
| 2005/0108568 | A1 | 5/2005 | Bussiere et al. |
| 2006/0010493 | A1 | 1/2006 | Piesco et al. |
| 2006/0048142 | A1 | 3/2006 | Roese et al. |

OTHER PUBLICATIONS

Marques, et al., "Dessemination of flow specification rules" http://tools.ietf.org/html/draft-marques-idr-flow-spec-03, Aug.23, 2005; pp. 1-23.
Greene, et al., "Remote Triggering Black Hole Filtering" Supplement to the Existing Section on Black Hole Filtering, Draft 0.2, ISP Essentials Supplement, Aug. 2, 2002, 10 pages.

(Continued)

*Primary Examiner* — Christopher Crutchfield
(74) *Attorney, Agent, or Firm* — Baker Botts L.L.P.

(57) ABSTRACT

Mitigating threats in a network includes receiving a message at a network device. The message includes device-independent parameters generated in response to a threat. The network device converts the parameters into one or more device-specific operations and then performs the operations to mitigate the threat.

23 Claims, 3 Drawing Sheets

(56) References Cited

OTHER PUBLICATIONS

Scott Lewandowski Daniel, Daniel J. Van Hok, Gerald C. O'Leary, Joshua W. Haines and Lee M. Rossey, SARA; Survivable Autonomic Response Architecture, DARPA Information Survivability conference & Exposition II, 2001, pp. 77-88.

Dan Schnackenberg, Kelly Djahandri, Infrastructure for Intrusion Detection and Response, Proceedings of the DARPA Information Survivability Conference and Exposition, Jan. 25-27, 2000, pp. 1-9.

Marko Jahnke, Jens Tolle, Sascha Lettgen, Michael bussmann and Uwe Weddige, A robust SNMP Based Infrastructure for Intrusion Detection and Response in Tactival MANETs, DIMVA 2006, Jul. 13-14, 2006, in Lecture Notes in Computer Science 4064, Springer-Verlag Berlin Heidelberg, pp. 164-180.

D. Schnackenberg, K. Djahandri, Infrastructure for Intrusion Detection and Response, Proceedings of the 2000 DARPA Information Survivability Conference and Exposition, vol. 2, pp. 3-11, 2000.

Ritch Felertag, Cliff Kahn, Phil Porras, Dan Schnackenberg, Stuart Stanford-Chen and Brian Tung, A Common Intrusion Specification Language, pp. 1-98, Jun. 11, 1999.

D. Schnackenberg, H. Holliday, R. Smith, K. Djahandri, D. Sterne; Cooperative Intrusion Traceback and Response Architecture (CITRA), Proceedings of the 2001 DARPA Information Survivability Conference and Exposition, vol. 1, pp. 56-68, 2001.

Q. Xue, J. Sun, Z. Wei, TJIDS: An Intrusion Detection Architecture for distributed Networks, Proceedings of the 2003 IEEE Canadian Conference on Electrical and Computer Engineering, vol. 2, pp. 709-712, 2003.

Cliff Kahn, Don Bolinger, Dan Schnackenberg, Communication in the Common Intrusion Detection Framework, pp. 1-45, Jun. 8, 1998.

Hermanns et al, U.S. Appl. No. 11/677,872, Non-final Office Action, May 1, 2009.

Hermanns et al, U.S. Appl. No. 11/677,872, Response Non-final Office Action, Jul. 29, 2009.

Hermanns et al, U.S. Appl. No. 11/677,872, Final Office Action, Dec. 9, 2009.

Hermanns et al, U.S. Appl. No. 11/677,872, Examiner's Interview Summary, Mar. 3, 2010.

Hermanns et al, U.S. Appl. No. 11/677,872, Request for Continued Examination, Mar. 5, 2010.

Hermanns et al, U.S. Appl. No. 11/677,872, Non-final Office Action, Aug. 27, 2012.

Hermanns et al, U.S. Appl. No. 11/677,872, Response to Non-final Office Action, Mar. 19, 2013.

Hermanns et al, U.S. Appl. No. 11/677,872, Notice of Allowance, Mar. 19, 2013.

Hermanns et al, U.S. Appl. No. 11/677,872, Issue Fee Notification, Jun. 26, 2013.

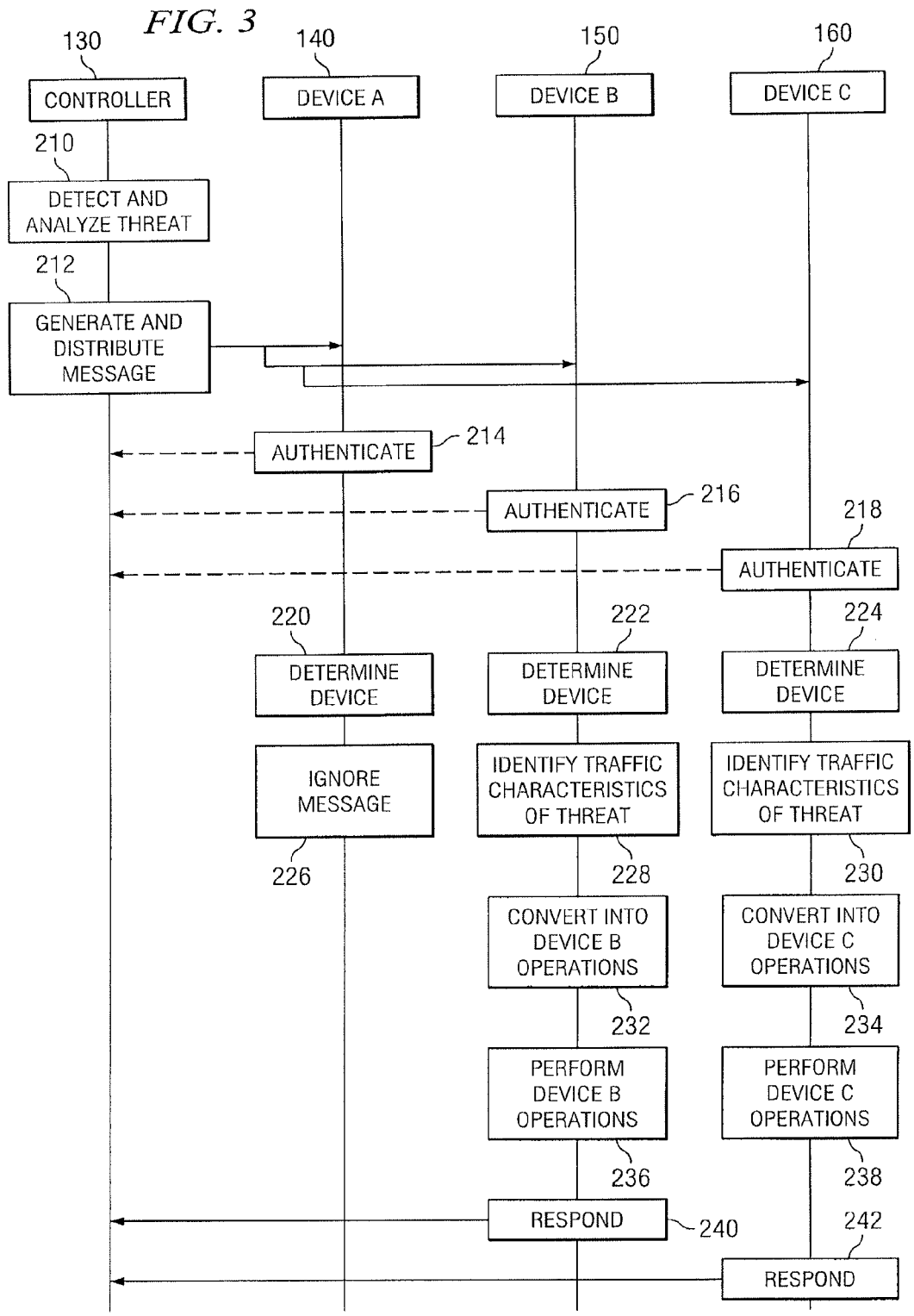

MITIGATING THREATS IN A NETWORK

CROSS REFERENCE TO RELATED APPLICATIONS

This application is a continuation of U.S. application Ser. No. 11/677,872, filed Feb. 22, 2007, and entitled "Mitigating Threats in a Network", now U.S. Pat. No. 8,488,488.

TECHNICAL FIELD

This invention relates generally to the field of telecommunications and more specifically to mitigating security threats in a network.

BACKGROUND

Networks may be attacked by various threats such as viruses, worms, denial of service attacks, and other damaging problems. If not mitigated properly, these threats can impair a network by disrupting communication, violating privacy, or compromising the integrity of information within the network.

Known techniques for mitigating threats include accessing each network device separately, and implementing mitigating operations at each device to block specific traffic or packets. These known techniques, however, are not efficient in certain situations. It is generally desirable to efficiently mitigate threats.

OVERVIEW OF THE DISCLOSURE

In accordance with the present invention, the disadvantages and problems associated with previous techniques for mitigating threats in a network may be reduced or eliminated.

According to one embodiment of the present invention, mitigating threats in a network includes receiving a message at a network device. The message includes device-independent parameters generated in response to a threat. The network device converts the parameters into one or more device-specific operations and then performs the operations to mitigate the threat.

Certain embodiments of the invention may provide one or more technical advantages. A technical advantage of one embodiment may be that a controller communicates a message network-wide that includes threat mitigation information for one or more network devices, or a particular subset of network devices. Communicating a message from a controller may allow for rapid deployment of mitigation operations.

A technical advantage of another embodiment may be that the content of the message includes device-independent information. A receiving network device may use rules stored locally to convert the message content into device-specific operations. Defining the message content in terms of device-independent information may allow for the same message to be sent to different types of network devices.

A technical advantage of another embodiment may be that a network device may authenticate a message. Authenticating the message may ensure that it is sent by a source, such as a controller, that the network device trusts. If the authentication fails the network device may discard the message without taking action.

A technical advantage of another embodiment may be that a network device may respond to the controller after processing the message. Responding to the message may allow network devices to provide feedback to the controller. Thus, the controller may use the responses to maintain state information for each network device. The controller may use the state information to send updates to previous messages, resend messages, and provide specific instructions to certain network devices.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 3 is a flow diagram illustrating one embodiment of a method for mitigating threats in a network that may be used with the network system of FIG. 1.

DETAILED DESCRIPTION OF THE DRAWINGS

Figure 1:
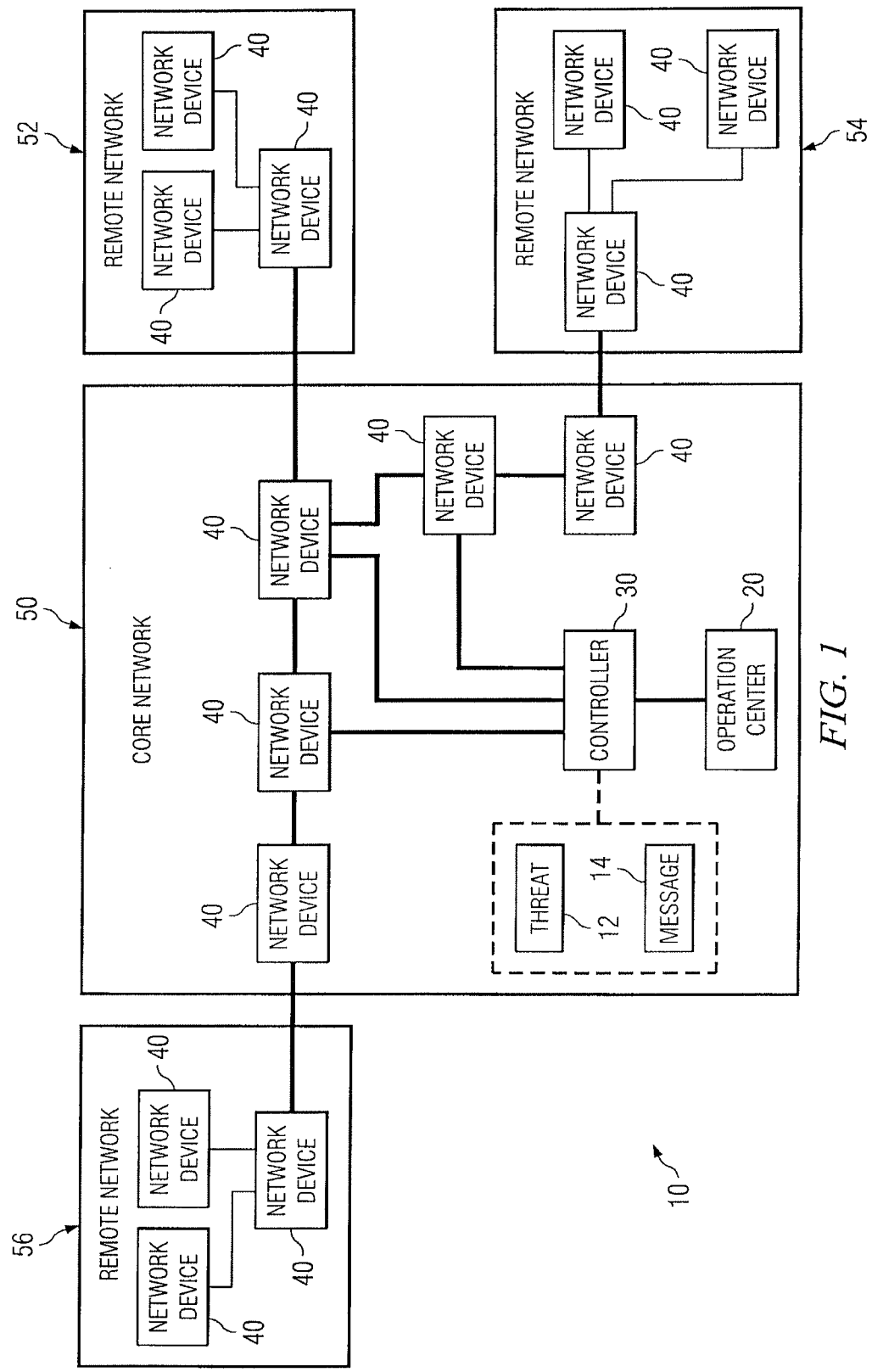
FIG. 1 is a block diagram illustrating one embodiment of a network system in which threats may be mitigated.
Figure 2:
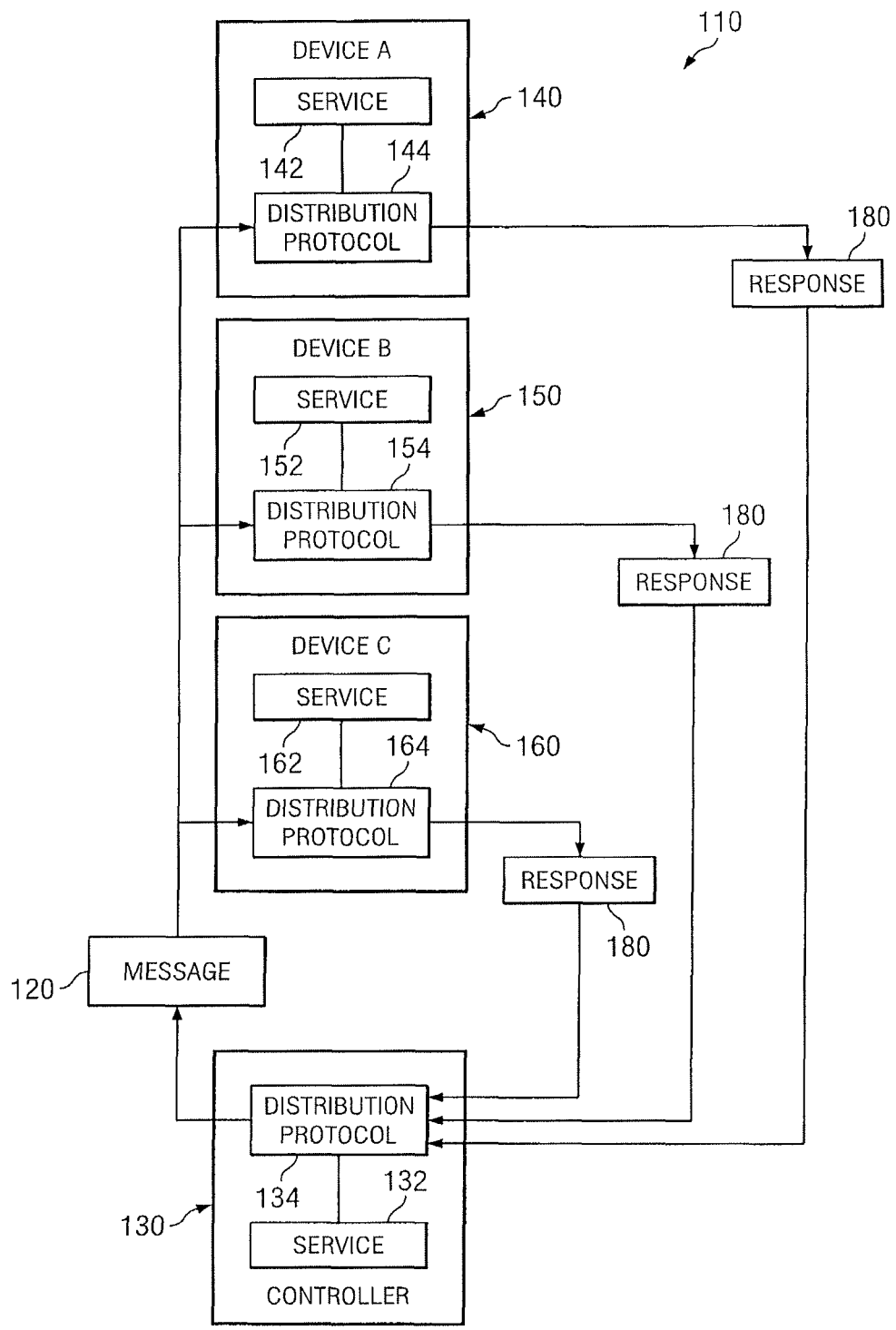
FIG. 2 is a block diagram illustrating an example of the embodiment of the network system of FIG. 1.

Embodiments of the present invention and its advantages are best understood by referring to FIGS. 1 through 3 of the drawings, like numerals being used for like and corresponding parts of the various drawings.

FIG. 1 is a block diagram illustrating one embodiment of a network system 10 in which threats may be mitigated. According to one embodiment, a controller may communicate a message that includes threat mitigation information to one or more network devices. Communicating a message from a controller may allow for rapid deployment of mitigation operations. According to another embodiment, the content of the message may include device-independent information. A receiving network device may use rules stored locally to convert the message content into device-specific operations. Defining the message content in terms of device-independent information may allow for the same message to be sent to different types of network devices.

According to the illustrated embodiment, system 10 operates to provide services such as communication sessions between devices such as network devices 40. A communication session may refer to an active communication between endpoints, measured from endpoint to endpoint. Information is communicated during a communication session, and is typically communicated by signals. Information may refer to voice, data, text, audio, video, multimedia, control, signaling, other information, or any combination of the preceding. The information may be communicated using instant messaging (IM), electronic mail (email), text chat, or other communication technique.

System 10 may communicate information in packet flows. A packet flow includes one or more packets sent from a source to a destination. A packet may comprise a bundle of data organized in a specific way for transmission, and a frame may comprise the payload of one or more packets organized in a specific way for transmission. A packet-based communication protocol such as Internet Protocol (IP) may be used to communicate the packet flows.

A packet flow may be identified in any suitable manner. As an example, a packet flow may be identified by a packet identifier giving the source and destination of the packet flow. A source may be given by an address such as the IP address, port, or both. Similarly, a destination may be given by an address such as the IP address, port, or both.

System 10 may utilize communication protocols and technologies to provide communication sessions. Example communication protocols and technologies include those described by the Institute of Electrical and Electronics Engineers, Inc. (IEEE) 802.xx standards such as 802.11, 802.16, or WiMAX standards, the International Telecommunications Union (ITU-T) standards, the European Telecommunications Standards Institute (ETSI) standards, Internet Engineering Task Force (IETF) standards, the third generation partnerships project (3GPP) standards, or other standards.

System 10 includes components such as devices. In general, a device may include any suitable arrangement of components operable to perform the operations of the device. As an example, a device may include logic, an interface, memory, other component, or any suitable combination of the preceding.

"Logic" may refer to hardware, software, other logic, or any suitable combination of the preceding that may be used to provide information or instructions. Certain logic may manage the operation of a device, and may comprise, for example, a processor. "Processor" may refer to any suitable logic operable to execute instructions and manipulate data to perform operations.

"Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

According to the illustrated embodiment, system 10 includes a core network 50 and remote networks 52, 54, and 56. In general, a network may comprise at least a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

Core network 50 and remote networks 52, 54, and 56 may represent a network capable of communicating information through signals through any suitable technique, such as IM, email, or text chat.

According to one embodiment, remote networks 52, 54, and 56 may represent geographically dispersed networks. Core network 50 may facilitate the exchange of information between remote networks 52, 54, and 56. For example, a client located in remote network 52 may communicate with remote network 54 and remote network 56 through core network 50.

According to the illustrated embodiment, core network 50 generates a message 14 in response to a threat 12. Core network 50 includes a controller 30, an operation center 20, and one or more network devices 40. Remote networks 52, 54, and 56 include one or more network devices 40.

Threat 12 may represent any malicious, destructive, or suspicious activity that occurs in a network. Threat 12 may also represent a potential vulnerability in the network that may be exploited. Threat 12 may come from a source external or internal to the network, and may be initiated by a program that accesses the network. Examples of threat 12 may include viruses, worms, and denial of service (DoS) attacks.

A virus may refer to any malicious program that may be introduced into a network by any suitable entry route, such as in an email attachment or a file load. Viruses may be classified into various types depending on file formats and infection routines. Examples of such viruses include: macro viruses, boot sector viruses, script viruses, file infecting viruses, ActiveX malicious code viruses, and destructive viruses.

A worm may refer to any self-contained program or a set of programs operable to spread functional copies of itself or its segments to other devices. This propagation of copies may occur via network connections or email attachments. A worm may self-replicate, and may attach itself to any port of network access to infiltrate other networks.

A DoS attack may refer to any operation employed to tie up resources, such as resources used to run websites or enterprise applications. Examples of DoS attacks include: Code Red, nimda, ping-pong, SYN flood, UDP flood, and Smurf attacks. In some cases, security gaps, glitches, or other vulnerabilities of an operating system may be exploited to crash a network. In other cases, large amounts of ostensibly valid traffic may be directed to single sites until the sites become overloaded and crash.

Message 14 may refer to any suitable communication that includes threat mitigation information for threat 12. Threat mitigation information may include one or more parameters that describe a device type, a traffic characteristic, a mitigation action, a priority, a severity, other information for mitigating threat 12, or any suitable combination of any of the preceding. A device type parameter may refer to a value that indicates the type of device to which message 14 applies. For example, the device type parameter may specify that message 14 applies to "router" devices. Router devices may include wireless routers, gateway routers, edge routers, or any other suitable router device. As another example, the device type parameter may specify that message 14 applies to "access" devices. Access devices may include network access points, wireless access points, base stations, or any other suitable access device. As another example, the device type parameter may specify that message 14 applies to "edge" devices. Edge devices may include switches, edge routers, multiplexers, or any other suitable edge device. As another example, the device type parameter may specify that message 14 applies to "security" devices. Security devices may include firewalls, proxy servers, intrusion detection systems, or any other suitable security device.

A priority parameter may be used to indicate a level of priority for message 14. A priority level may indicate an urgency for message 14. For example, messages with a high priority may be processed by a network device before messages with a normal priority. The priority parameter may include a number indicating a priority for message 14. For example, if the number is set to "1," then message 14 may be processed by a network device with a high priority. Alternatively, if the number is set to "0," then message 14 may be processed by a network device with a normal priority. In other embodiments, the priority level may include other example numbers.

A severity parameter may be used to indicate a level of severity for message 14. A severity level may indicate a degree of malicious, destructive, or suspicious activity for threat 12. For example, a "high" severity level may indicate that threat 12 has the potential to cause a high degree of malicious, destructive, or suspicious activity. As another example, a "low" severity level may indicate that threat 12 has the potential to cause a low degree of malicious, destructive, or suspicious activity.

A traffic characteristic parameter may be used to identify traffic corresponding to threat 12. For example, the parameter may include a source identifier identifying the source of threat 12. As another example, the parameter may include a traffic protocol identifier identifying the protocol used by threat 12. As another example, the parameter may include a port number identifying the target network port of threat 12. Message 14 may include any combination of the above traffic characteristics, and may include any other traffic characteristics suitable for identifying traffic corresponding to threat 12.

A mitigation action parameter may specify an action that a network device should perform to mitigate traffic corresponding to threat 12. For example, message 14 may indicate an action such as "block," "drop," "rate limit," "re-route," "log," or any other suitable action. A "block" action may refer to an action involving stopping packets at the network device. A "drop" action may refer to an action involving discarding packets at the network device. A "rate limit" action may refer to an action involving allowing a certain number of packets at a selected rate at the network device. A "re-route" action may refer to an action involving diverting packets at the network device. A "log" action may refer to an action involving logging traffic information at the network device. Message 14 may include any other device-independent information suitable for mitigating threat 12.

According to one embodiment, the content of message 14 may be device-independent. Device-independent content may refer to information capable of being processed by different types of network devices. Receiving network devices may convert the device-independent content of message 14 into device-specific operations. Device-specific operations may refer to a series of actions designed to be performed by a network device of a specific type. For example, a "router" device may convert an action of "re-route" into device-specific operations such as configuring a routing table, checking a destination address of a packet, and diverting the packet based on the routing table.

Controller 30 represents any suitable device operable to generate and communicate message 14 to one or more network devices 40. Controller 30 may also be operable to detect and analyze threat 12. Controller 30 may further be operable to encrypt message 14 so that one or more network devices 40 may decrypt the message. Controller 30 may further be operable to sign message 14 so that one or more network devices 40 may authenticate the message. Controller 30 may further be operable to receive responses from one or more network devices 40. Controller 30 may use the responses to maintain state information for each of the one or more network devices. Controller 30 may use the state information to send updates to previous messages, resend messages, and provide specific instructions to certain network devices. Although FIG. 1 provides one example of controller 30 as operating within core network 50, in other embodiments controller 30 may operate separately from core network 50. Alternatively, controller 30 may operate within a network device 40 such as a bridge, router, hub, switch, gateway, or any other suitable network device.

Operation center 20 represents any hardware and/or software module suitable to control or monitor one or more network devices 40 and controller 30. According to one embodiment, operation center 20 may communicate with network devices 40 in core network 50 to receive and transmit data. Operation center 20 may be further operable to configure the content of message 14 communicated by controller 30. For example, operation center 20 may interact with controller 30 to define the content of message 14 with threat mitigation information on a per-threat basis. Although FIG. 1 provides one example of operation center 20 as operating within core network 50, in other embodiments operation center 20 may operate separately from core network 50. In other embodiments, operation center 20 may be omitted and controller 30 may be configured by another device in the network.

A network device 40 may represent any device operable to receive, send, or exchange packets in system 10. Network device 40 may be, for example, a session border controller, gatekeeper, call manager, conference bridge, router, hub, switch, gateway, access point, endpoint, edge point, or any other hardware, software, or embedded logic implementing any suitable communication protocol to allow for the exchange of packets in system 10.

According to one embodiment of operation, controller 30 may detect and analyze threat 12 to generate message 14. Operation center 20 may receive a signal indicating controller 30 has detected threat 12. According to another embodiment, operation center 20 may detect and analyze threat 12, and may configure controller 30 to generate message 14. According to another embodiment, controller 30 may be configured to generate message 14 in anticipation of threat 12, such as in the case of an identification of a potential vulnerability in the network that may be exploited.

According to one embodiment, message 14 is communicated to one or more network devices 40 in core network 50. According to the embodiment, message 14 may include device-independent information. In various embodiments, message 14 may be communicated beyond core network 50 to network devices 40 of remote networks 52, 54, and 56.

A network device 40 receiving message 14 may determine if message 14 is applicable based on the device type listed in message 14. If message 14 applies, network device 40 may identify traffic characteristics corresponding to threat 12. Network device 40 may convert the mitigation action stored in the content of message 14 into device-specific operations using locally stored rules. Network device 40 may perform the device-specific operations to mitigate threat 12.

Modifications, additions, or omissions may be made to system 10 without departing from the scope of the invention. The components of system 10 may be integrated or separated according to particular needs. Moreover, the operations of system 10 may be performed by more, fewer, or other devices. Additionally, the operations of system 10 may be performed using any suitable logic. As used in this document, "each" refers to each member of a set or each member of a subset of the set.

FIG. 2 is a block diagram illustrating an example of the embodiment of network system 10 of FIG. 1. According to one embodiment, a controller 130 may communicate a message 120 to network devices A 140, B 150, and C 160. Network devices A 140, B 150, and C 160 may use local rules to convert the content of the message 120 into device-specific operations. Network devices A 140, B 150, and C 160 may send a response 180 to controller 130 to inform controller 130 that network devices A 140, B 150, and C 160 have received and processed message 120.

According to the illustrated embodiment, a system 110 includes a controller 130 and network devices A 140, B 150, and C 160. Controller 130 and network devices A 140, B 150, and C 160 may be substantially similar to controller 30 and network devices 40, respectively, of FIG. 1.

Controller 130 includes a service 132 and a distribution protocol 134, network devices A 140, B 150, and C 160 include services 142, 152, and 162, respectively. Services 132, 142, 152, and 162 may refer to any suitable program operable to generate and/or receive message 120. Services 132, 142, 152, and 162 may also refer to any suitable program further operable to generate and/or receive response 180. One such program is the Threat Mitigation Service (TMS) program from CISCO SYSTEMS, INC. Service 132 operates in conjunction with services 142, 152, and 162 of network devices A 140, B 150, and C 160. For example, service 132 may generate threat mitigation information inside message 120, which is received by service 142 of network device A 140.

According to one embodiment, service 132 may operate over distribution protocol 134. Distribution protocol 134 may refer to any protocol suitable to communicate threat mitigation information between controller 130 and network devices A 140, B 150, and C 160. One such distribution protocol is the Threat Information Distribution Protocol (TIDP) from CISCO SYSTEMS, INC. Distribution protocol 134 operates in conjunction with distribution protocols 144, 154, and 164 of network devices A 140, B 150, and C 160, respectively.

Distribution protocol 134 may operate using any suitable networking protocol that provides a communicative platform for system 110. Thus, distribution protocol 134 may include a configuration capable of operating over Transmission Control Protocol (TCP) as a form of IP communication for the transmission or reception of packets in a network. Distribution protocol 134 may operate over User Datagram Protocol (UDP), Stream Control Transmission Protocol (SCTP), or any other suitable protocol.

According to one embodiment, distribution protocol 134 may encrypt and sign message 120 before controller 130 sends message 120 to network devices A 140, B 150, and C 160. Upon receiving message 120, network devices A 140, B 150, and C 160 may decrypt and authenticate message 120 using distribution protocols 144, 154, and 164. Authentication ensures that the receiving devices can verify the source of the message and ensure it was sent from a trusted source. Encryption ensures that only the intended recipients can read and understand the message.

In various embodiments, distribution protocol 134 may include any suitable authentication technique. According to one embodiment, distribution protocol 134 may use a public/private key authentication technique. A public/private key authentication technique allows a recipient of data to authenticate the origin of the data. For example, a sender encrypts authentication data using the sender's private key. To validate the data, a recipient decrypts the data using the sender's public key. If the authentication data is successfully decrypted using the sender's public key, the message must have originated from the sender, since only the sender has access to the sender's private key. In other embodiments, distribution protocol 134 may include other authentication techniques.

According to one embodiment, network devices A 140, B 150, and C 160 may locally store rules for converting the content of message 120 into one or more device-specific operations. For example, network device A 140 may store a rule that maps an action of "block" to one or more device-specific "drop" operations operable to discard packets corresponding to traffic identified in message 120. As another example, network device B 150 may store a rule that maps an action of "block" to one or more device-specific "block" operations operable to stop packets corresponding to traffic identified in message 120. As another example, network device C 160 may store a rule that maps an action of "block" to one or more device-specific "re-route" operations operable to divert packets corresponding to traffic identified in message 120.

TABLE 1 illustrates example device-specific operations designed to be performed according to the content of message 120. According to the example, network devices A 140, B 150, and C 160 may locally store rules to convert a device-independent action from the first column, into one or more device-specific operations.

TABLE 1

| Device-Independent Action | Network Device A | Network Device B | Network Device C |
|---|---|---|---|
| "block" | device-specific "drop" operations | device-specific "block" operations | device-specific "re-route" operations |
| "re-route" | device-specific "drop" operations | device-specific "re-route" operations | device-specific "re-route" operations |
| "log" | device-specific "log" operations | device-specific "re-route" operations | device-specific "log" operations |

However, the present disclosure contemplates many types of actions and corresponding device-specific operations. Various embodiments may include some, all, or none of the enumerated actions and corresponding device-specific operations.

According to one embodiment, network devices A 140, B 150, and C 160 may perform one or more device-specific operations to mitigate a threat. For example, network device A 140 may apply an Access Control List (ACL) as a device-specific operation. An ACL refers to a list that controls access to and/or denial of services. An ACL may contain a list of services available, each with a list of the hosts permitted to use the service. Thus, an ACL can determine whether to forward or filter packets with a certain IP address or other traffic characteristics. For example, network device A 140 may store a rule that maps an action of "block" to one or more device-specific "drop" operations operable to discard packets corresponding to traffic identified in message 120. Network device A 140 may discard packets corresponding to traffic identified in message 120 by applying an ACL.

According to one embodiment, network devices A 140, B 150, and C 160 may respond to controller 130 after processing message 120. Responding may refer to any action involving providing feedback to controller 130 to indicate the result of processing message 120. Providing feedback to controller 130 may allow controller 130 to maintain state information for network devices A 140, B 150, and C 160. Providing feedback to controller 130 may also allow controller 130 to take specific actions with respect to certain network devices. For example, controller 130 may determine, based on the responses, that a specific network device, such as network device B 150, has received and processed message 120. As another example, controller 130 may determine, based on the responses, that a particular device, such as network device B 150, should receive an updated message 120. As another example, controller 130 may determine, based on the responses or a failed response, that a specific network device, such as network device A 140, did not receive message 120. Thus, controller 130 may resend message 120 to network device A 140 until network device A 140 responds.

Modifications, additions, or omissions may be made to system 110 without departing from the scope of the invention. The components of system 110 may be integrated or separated according to particular needs. Moreover, the operations of system 110 may be performed by more, fewer, or other devices. Additionally, the operations of system 110 may be performed using any suitable logic.

FIG. 3 is a flow diagram illustrating one embodiment of a method for mitigating threats in a network that may be used with network system 10 of FIG. 1. The method begins at step 210, where controller 130 detects and analyzes a threat. In other embodiments of the invention, controller 130 may receive threat information through other means such as a security device, user input, or any other suitable means operable to detect and analyze a threat. Controller 130 generates and communicates a message to network devices A 140, B 150, and C 160 at step 212.

Network devices A 140, B 150, and C 160 may perform an authenticating procedure at steps 214, 216, and 218 to authenticate that the message originated from controller 130. If the message is not authenticated, network devices A 140, B 150, and C 160 may cease to perform further operations with respect to the message. Network devices A 140, B 150, and C 160 may also perform a determination procedure at steps 220, 222, and 224 to determine whether the message applies.

Network device A 140 determines at step 220 that the message does not apply to network device A 140, so network device A 140 ignores the message at step 226. After ignoring the message, network device A 140 may cease to perform further operations with respect to the message. Alternatively, network device A 140 may respond to controller 130. Responding to the message may allow network device A 140 to provide feedback to controller 130. Controller 130 may use the feedback to maintain state information for network device A 140.

Network devices B 150 and C 160 determine that the message applies at steps 222 and 224, respectively, and identify threat traffic characteristics from the message at steps 228 and 230, respectively. Network device B 150 converts the content of the message into device-specific operations at step 232 using rules stored at network device B 150. For example, network device B 150 may store a rule that maps an action of "block" to one or more device-specific "block" operations operable to stop packets corresponding to the specified traffic characteristics. At step 236, network device B 150 performs the device-specific operations. For example, network device B 150 may perform the device-specific "block" operations by stopping the specified traffic by applying an ACL. At step 240, network device B 150 may respond to controller 130. Responding to the message may allow network device B 150 to provide feedback to controller 130. Controller 130 may use the response to maintain state information for network device B 150. For example, controller 130 may determine, based on the response, that network device B 150 should receive an updated message.

Network device C 160 converts the content of the message into device-specific operations at step 234 using rules stored at network device C 160. For example, network device C 160 may store a rule that maps an action of "block" to one or more device-specific "re-route" operations operable to divert packets corresponding to the specified traffic characteristics. At step 238, network device C 160 performs the device-specific operations. For example, network device C 160 may perform the device-specific "re-route" operations by redirecting the specified traffic to another network device. At step 242, network device C 160 may respond to controller 130. Responding to the message may allow network device C 160 to provide feedback to controller 130. Controller 130 may use the response to maintain state information for network device C 160. For example, controller 130 may determine, based on the response or a failed response, that network device C 160 did not receive the message. Thus, controller 130 may resend the message to network device C 160 until network device C 160 responds. After performing the operations, the method terminates.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that a controller communicates a message network-wide that includes threat mitigation information for one or more network devices, or a particular subset of network devices. Communicating a message from a controller may allow for rapid deployment of mitigation operations.

A technical advantage of another embodiment may be that the content of the message includes device-independent information. A receiving network device may use rules stored locally to convert the message content into device-specific operations. Defining the message content in terms of device-independent information may allow for the same message to be sent to different types of network devices.

A technical advantage of another embodiment may be that a network device may authenticate a message. Authenticating the message may ensure that it is sent by a source, such as a controller, that the network device trusts. If the authentication fails the network device may discard the message without taking action.

A technical advantage of another embodiment may be that a network device may respond to the controller after processing the message. Responding to the message may allow network devices to provide feedback to the controller. Thus, the controller may use the responses to maintain state information for each network device. The controller may use the state information to send updates to previous messages, resend messages, and provide specific instructions to certain network devices.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for mitigating threats in a network, comprising:

receiving a message at a network device coupled to a network comprising a plurality of different types of network devices, the message generated in response to a threat and broadcasted over the network to the network device and the plurality of different types of network devices, the message comprising a plurality of device-independent parameters capable of being processed by the network device and the plurality of different types of network devices, the plurality of device-independent parameters comprising a severity parameter and an action parameter, the severity parameter indicating a severity level for the message, the action parameter indicating a device-independent operation to be performed by the network device, the network device and the plurality of different types of network devices each having one or more mapping rules that map the device-independent operation to one or more device-specific operations operable to mitigate the threat;
establishing the device-independent operation from the message;
identifying the one or more mapping rules that correspond to the established device-independent operation;
determining the one or more device-specific operations in accordance with the one or more identified mapping rules;
converting the plurality of device-independent parameters into the one or more device-specific operations operable to mitigate the threat;
performing the one or more device-specific operations to mitigate the threat;
sending, to the entity from which the message was received, a response to the message based on the performance of the one or more device-specific operations; and
further comprising sending state information for the network device to the entity from which the message was received and receiving an update to the message from the entity based on the state information.

2. The method of claim 1, wherein the plurality of device-independent parameters further comprises:
a device type parameter indicating a device type;
a priority parameter indicating a priority for the message; and
a traffic parameter indicating traffic corresponding to the threat.

3. The method of claim 1, further comprising:
identifying a device type parameter from the plurality of device-independent parameters; and
establishing whether the message applies to the network device according to the device type parameter.

4. The method of claim 1, wherein performing the one or more device-specific operations comprises applying an Access Control List (ACL).

5. The method of claim 1, further comprising authenticating the message using a public/private key authentication technique.

6. The method of claim 1, wherein the update to the message is a retransmission of the message.

7. A network device operable to mitigate threats in a network, comprising:
an interface, including a hardware processor, coupled to a network comprising a plurality of different types of network devices, operable to:
receive a message, the message generated in response to a threat and broadcasted over the network to the network device and the plurality of different types of network devices, the message comprising a plurality of device-independent parameters capable of being processed by the network device and the plurality of different types of network devices, the plurality of device-independent parameters comprising a severity parameter and an action parameter, the severity parameter indicating a severity level for the message, the action parameter indicating a device-independent operation to be performed by the network device, the network device and the plurality of different types of network devices each having one or more mapping rules that map the device-independent operation to one or more device-specific operations operable to mitigate the threat; and a processor operable to:
establish the device-independent operation from the message;
identify the one or more mapping rules that correspond to the established device-independent operation;
determine the one or more device-specific operations in accordance with the one or more identified mapping rules;
convert the plurality of device-independent parameters into the one or more device-specific operations operable to mitigate the threat;
perform the one or more device-specific operations to mitigate the threat; and
send, to the entity from which the message was received, state information for the network device and a response to the message based on the performance of the one or more device-specific operations; and
wherein the network device is further operable to receive an update to the message from the entity based on the state information.

8. The network device of claim 7, wherein the plurality of device-independent parameters further comprises:
a device type parameter indicating a device type;
a priority parameter indicating a priority for the message; and
a traffic parameter indicating traffic corresponding to the threat.

9. The network device of claim 7, the processor further operable to:
identify a device type parameter from the plurality of device-independent parameters; and
establish whether the message applies to the network device according to the device type parameter.

10. The network device of claim 7, the processor further operable to perform the one or more device-specific operations by applying an Access Control List (ACL).

11. The network device of claim 7, the processor further operable to authenticate the message using a public/private key authentication technique.

12. Logic for mitigating threats in a network, the logic embodied in a non-transitory computer-readable medium and operable to:
receive a message at a network device coupled to a network comprising a plurality of different types of network devices, the message generated in response to a threat and broadcasted over the network to the network device and the plurality of different types of network devices, the message comprising a plurality of device-independent parameters capable of being processed by the network device and the plurality of different types of network devices, the plurality of device-independent parameters comprising a severity parameter and an action parameter, the severity parameter indicating a severity level for the message, the action parameter indicating a device-independent operation to be performed by the network device, the network device and the plurality of different types of network devices each having one or more mapping rules that map the device-independent operation to one or more device-specific operations operable to mitigate the threat;
establish the device-independent operation from the message;
identify the one or more mapping rules that correspond to the established device-independent operation;
determine the one or more device-specific operations in accordance with the one or more identified mapping rules;

convert the plurality of device-independent parameters into the one or more device-specific operations operable to mitigate the threat;

perform the one or more device-specific operations to mitigate the threat;

send, to the entity from which the message was received, state information for the network device and a response to the message based on the performance of the one or more device-specific operations; and wherein the logic is further operable to receive an update to the message from the entity based on the state information.

13. The logic of claim 12, wherein the plurality of device-independent parameters further comprises:

a device type parameter indicating a device type;

a priority parameter indicating a priority for the message; and a traffic parameter indicating traffic corresponding to the threat.

14. The logic of claim 12, the logic further operable to:

identify a device type parameter from the plurality of device-independent parameters; and establish whether the message applies to the network device according to the device type parameter.

15. The logic of claim 12, the logic further operable to perform the one or more device-specific operations by applying an Access Control List (ACL).

16. The logic of claim 12, the logic further operable to authenticate the message using a public/private key authentication technique.

17. A system for mitigating threats in a network, comprising:

a controller comprising one or more hardware processors, the controller operable to:

generate a message in response to a threat; and broadcast the message over a network comprising a network device and a plurality of different types of network devices, the message comprising a plurality of device-independent parameters capable of being processed by the network device and the plurality of different types of network devices; and the network device comprising one or more hardware processors, the network device coupled to the network operable to:

receive the message, the plurality of device-independent parameters comprising a severity parameter and an action parameter, the severity parameter indicating a severity level for the message, the action parameter indicating a device-independent operation to be performed by the network device, the network device and the plurality of different types of network devices each having one or more mapping rules that map the device-independent operation to one or more device-specific operations operable to mitigate the threat;

establish the device-independent operation from the message;

identify the one or more mapping rules that correspond to the established device-independent operation;

determine the one or more device-specific operations in accordance with the one or more identified mapping rules;

convert the plurality of device-independent parameters into the one or more device-specific operations operable to mitigate the threat;

perform the one or more device-specific operations to mitigate the threat;

send, to the controller from which the message was received, a response to the message based on the performance of the one or more device-specific operations; and send state information for the network device to the controller and receive an update to the message from the controller based on the state information.

18. The system of claim 17, wherein the plurality of device-independent parameters further comprises:

a device type parameter indicating a device type;

a priority parameter indicating a priority for the message; and a traffic parameter indicating traffic corresponding to the threat.

19. The system of claim 17, the network device further operable to:

identify a device type parameter from the plurality of device-independent parameters; and establish whether the message applies to the network device according to the device type parameter.

20. The system of claim 17, the network device further operable to perform the one or more device-specific operations by applying an Access Control List (ACL).

21. The system of claim 17, wherein the controller is further operable to sign the message; and wherein the network device is further operable to authenticate the message using a public/private key authentication technique.

22. A controller operable to mitigate threats in a network, comprising:

a hardware processor operable to:

generate a message in response to a threat, the message comprising a plurality of device-independent parameters capable of being processed by a network device and a plurality of different types of network devices; and an interface comprising one or more hardware processors coupled to a network comprising the network device and the plurality of different types of network devices operable to:

broadcast the message over the network, the network device operable to:

receive the message, the plurality of device-independent parameters comprising a severity parameter and an action parameter, the severity parameter indicating a severity level for the message, the action parameter indicating a device-independent operation to be performed by the one or more network devices, the network device and the plurality of different types of network devices each having one or more mapping rules that map the device-independent operation to one or more device-specific operations operable to mitigate the threat;

establish the device-independent operation from the message;

identify the one or more mapping rules that correspond to the established device-independent operation;

determine the one or more device-specific operations in accordance with the one or more identified mapping rules;

convert the plurality of device-independent parameters into the one or more device-specific operations operable to mitigate the threat;

perform the one or more device-specific operations to mitigate the threat;

send, to the hardware processor from which the message was received, a response to the message based on the performance of the one or more device-specific operations; and send state information for the network device to the processor and receive an update to the message from the processor based on the state information.

23. The controller of claim 22, wherein the plurality of device-independent parameters further comprises:

a device type parameter indicating a device type;

a priority parameter indicating a priority for the message; and a traffic parameter indicating traffic corresponding to the threat.

\* \* \* \* \*

UNITED STATES PATENT AND TRADEMARK OFFICE
CERTIFICATE OF CORRECTION

PATENT NO. : 9,083,737 B2  
APPLICATION NO. : 13/938917  
DATED : July 14, 2015  
INVENTOR(S) : Klaus Hermanns et al.

Page 1 of 1

It is certified that error appears in the above-identified patent and that said Letters Patent is hereby corrected as shown below:

On the title page:

Item 72

INVENTORS:

After "Venkateswara Rao," delete "Yartagadda" and insert -- Yarlagadda --.

Signed and Sealed this  
First Day of December, 2015

Michelle K. Lee  
*Director of the United States Patent and Trademark Office*